Apr. 24, 1923.
A. A. DREES
1,452,495
AIR BRAKE RELEASE VALVE
Filed June 19, 1922
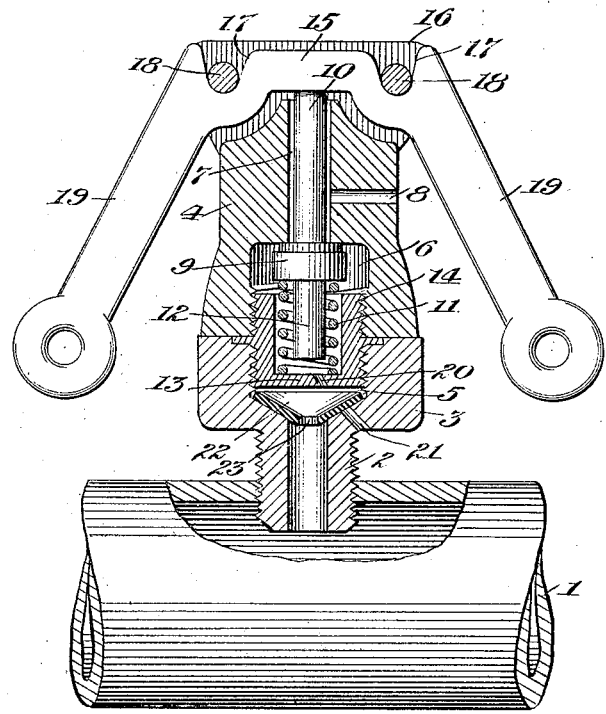
Inventor:
Andrew A. Drees,
By Chas. E. Riordon
Att'y.

Patented Apr. 24, 1923.

1,452,495

UNITED STATES PATENT OFFICE.

ANDREW A. DREES, OF LEWISTOWN, MONTANA, ASSIGNOR OF ONE-HALF TO PHILIP B. ROHNER, OF LEWISTOWN, MONTANA.

AIR-BRAKE-RELEASE VALVE.

Application filed June 19, 1922. Serial No. 569,514.

*To all whom it may concern:*

Be it known that I, ANDREW A. DREES, a resident of Lewistown, in the county of Fergus and State of Montana, a citizen of the United States, have invented certain new and useful Improvements in Air-Brake-Release Valves, of which the following is a specification.

This invention relates to air brake release valves and has for its object the provision of simple and inexpensive means whereby the time required to release the brakes on each car will be very materially reduced and the danger to life and limb of the operators will be overcome. Under the present practice, an operator must manually hold the bleed or release valve on each car open from one to three minutes which aggregates a very considerable waste of time in the case of a long freight train, and it frequently happens that the cars are set in motion before the brakes have been fully released so that there is grave danger of serious injury to the operator. These objections are effectually overcome by the use of my invention which is illustrated in the accompanying drawing and will be hereinafter first fully described and then particularly defined in the appended claims.

The drawing shows a sectional elevation of a valve embodying my improvements.

The reference numeral 1 denotes a portion of the auxiliary reservoir or the brake cylinder. Into this cylinder is threaded the nipple or stem 2 of a lower valve body or casing 3, and an upper valve casing or body member 4 rests upon said lower body member or casing. The members 3 and 4 are formed with axially alined chambers 5 and 6 in their opposed ends and an outlet 7 leads from the upper chamber 6, an auxiliary or branch outlet 8 being usually provided to lead from the outlet 7 through the side of the body member 4, as shown. The upper end of the chamber 6 forms a seat for the main release valve 9 which has a stem 10 extending through the main outlet passage 7 and projecting above the upper end thereof.

A spring 11 coiled around the stud or stem 12, depending from the valve 9, holds the valve normally seated, the spring bearing at its upper end against the valve and at its lower end against the head 13 of a coupling sleeve 14 which has its opposite ends threaded into the meeting ends of the chambers 5 and 6 and thereby securely connects the members 3 and 4. The upper extremity of the valve stem 10 bears against a rocker or lever 15 which is disposed within a recess or groove 16 across the upper end of the body member 4, said rocker or lever being provided with notches or seats 17 in its upper edge to engage the respective fulcrum pins 18 disposed transversely in the recess or groove 16 whereby the rocker may be operated from either end. Arms 19 depend from the ends of the rocker and chains or cables extend from the lower ends of these arms to the sides of the car so that the operator may work from either side. A port 20 is provided through the head 13 for the flow of air from the cylinder 1 to the valve 9, said valve being seated, when the brakes are applied, under the influence of the spring 11 and the air pressure from the cylinder.

The construction thus far described is now in use. To release the brakes, it is necessary to reduce the pressure in the cylinder or reservoir 1, and this result is accomplished by rocking the rocker 15 so that the stem 10 is depressed and the valve 9 is unseated, permitting the air to escape through the outlets 7 and 8. Obviously, however, the operator must hold the valve depressed against the action of the spring 11 until the required reduction of pressure has been effected. By my invention, the operator merely gives an initial pull upon either arm 19 to start the exhausting flow whereupon the flow will be automatically maintained until the pressure reaches the proper low degree, at which time the flow will be automatically cut off.

In applying my invention, I form an outlet port 21 through the casing or body member 3 leading from the lower end of the chamber 5 therein which lower end is preferably tapered, as shown, with its inverted apex at the bore of the nipple 3. Fitted to the tapered lower end of the chamber 5 and normally covering and closing the port 21, is a diaphragm or valve 22 which may conveniently be a rubber disk pressed to hollow conical form and having a port or opening 23 through its center.

When the valve 9 is unseated in the manner above described, the rush of air to and through the port 20 creates a suction which causes the diaphragm to seat against the head 13 so that it covers the port 20 and uncovers the port 21, the air then escaping through the port 21 and pressing the diaphragm flat against the head 13 until the pressure in the cylinder 1 is properly reduced whereupon the diaphragm will return to its normal position as shown.

It will be readily seen that I have provided a very simple and inexpensive device whereby the operation of bleeding the cylinder to release the brakes will be performed automatically after the exhausting flow is initially set up.

Having thus described my invention, what I claim as new and desire to secure by Letters Patent of the United States is:—

1. The combination with a brake release valve including a main outlet, a valve normally seated and closing said outlet, and means for unseating said valve, of an upper port leading to said main outlet, a lower port constituting an auxiliary outlet, and a diaphragm arranged between said upper and lower ports and normally closing the lower port and having a central opening whereby when the valve is unseated suction through the diaphragm will operate the diaphragm closing the upper port and opening the lower port.

2. In a brake release valve, an upper port, a lower port, and a diaphragm disposed between the ports and normally closing the lower port, said diaphragm being operable under pressure from the brake cylinder to open the lower port and close the upper port.

In testimony whereof I hereunto affix my signature.

ANDREW A. DREES.